(12) United States Patent
Houmeau et al.

(10) Patent No.: US 7,489,337 B2
(45) Date of Patent: Feb. 10, 2009

(54) METHOD AND SYSTEM FOR SYNCHRONIZING COLORIMETRIC RENDERING OF A JUXTAPOSITION OF DISPLAY SURFACES

(75) Inventors: François Houmeau, Paris (FR); Olivier Gachignard, Montrouge (FR); Alain Leyreloup, Issy les Moulineaux Cedex (FR)

(73) Assignee: Chartoleaux KG Limited Liability Company, Wilmington, DE (US)

( * ) Notice: Subject to any disclaimer, the term of this patent is extended or adjusted under 35 U.S.C. 154(b) by 588 days.

(21) Appl. No.: 10/505,987

(22) PCT Filed: Feb. 18, 2003

(86) PCT No.: PCT/FR03/00525

§ 371 (c)(1),
(2), (4) Date: Jan. 25, 2005

(87) PCT Pub. No.: WO03/075581

PCT Pub. Date: Sep. 12, 2003

(65) Prior Publication Data

US 2005/0117053 A1      Jun. 2, 2005

(30) Foreign Application Priority Data

Mar. 7, 2002    (FR)    .................................. 02 02911

(51) Int. Cl.
H04N 13/04     (2006.01)
H04N 15/00     (2006.01)
H04N 17/02     (2006.01)
H04N 9/73      (2006.01)
G09G 5/00      (2006.01)
G06K 9/00      (2006.01)

(52) U.S. Cl. .......................... 348/182; 348/52; 348/179; 348/189; 348/658; 348/745; 348/180; 345/1.3; 382/167

(58) Field of Classification Search ................... 348/52, 348/179, 180, 182, 189, 658, 744, 745; 345/1.3; 382/162, 167
See application file for complete search history.

(56) References Cited

U.S. PATENT DOCUMENTS 5,541,641 A * 7/1996 Shimada ....................... 348/58

(Continued)

FOREIGN PATENT DOCUMENTS

EP           0 989 757 A       3/2000

(Continued)

Primary Examiner—Brian P Yenke
(74) Attorney, Agent, or Firm—McDonnell Boehnen Hulbert & Berghoff LLP

(57) ABSTRACT

A method for making uniform the colorimetric rendering of a display surface including several adjacent display screens (10a, 10b), comprising for each pair of adjacent screens (10a, 10b) steps of: periodically sampling (21) by a calculation device (5) image data in two corresponding screen (10a, 10b) areas (13a, 13b) in the pair of adjacent screens, analyzing (22, 23, 24) by the calculation device (5) image data sampled in each period to determine a difference in calorimetric rendering between the two screen areas, determining by a correction device (6) connected to the calculation device a process to be applied to the video stream to one of the two video systems controlling the two screens in the pair of adjacent screens, by applying a predetermined correction law to the difference in calorimetric rendering, and applying (26) by the correction device the process to said video system, in order to make the calorimetric rendering of the display surface uniform.

12 Claims, 2 Drawing Sheets

U.S. PATENT DOCUMENTS

| | | | |
|---|---|---|---|
| 5,883,476 A * | 3/1999 | Noguchi et al. | 315/368.12 |
| 6,020,868 A | 2/2000 | Katyl et al. | |
| 6,043,797 A | 3/2000 | Gulick et al. | |
| 6,219,011 B1 | 4/2001 | Livni et al. | |
| 6,333,768 B1 * | 12/2001 | Kawashima et al. | 348/806 |
| 6,340,976 B1 * | 1/2002 | Oguchi et al. | 345/690 |
| 6,525,772 B2 * | 2/2003 | Johnson et al. | 348/383 |
| 6,538,705 B1 * | 3/2003 | Higurashi et al. | 348/745 |
| 6,558,006 B2 * | 5/2003 | Ioka | 353/94 |
| 6,570,623 B1 * | 5/2003 | Li et al. | 348/383 |
| 6,611,241 B1 * | 8/2003 | Firester et al. | 345/1.3 |
| 6,717,625 B1 * | 4/2004 | Thielemans | 348/745 |
| 6,814,448 B2 * | 11/2004 | Ioka | 353/69 |
| 6,859,224 B2 * | 2/2005 | Sugiura et al. | 348/188 |
| 6,864,894 B1 * | 3/2005 | Lefebvre et al. | 345/506 |
| 6,864,921 B2 * | 3/2005 | Kaneda et al. | 348/383 |
| 6,953,250 B2 * | 10/2005 | Yasumi et al. | 353/31 |
| 7,002,606 B2 * | 2/2006 | Tanaka et al. | 345/690 |
| 7,050,074 B1 * | 5/2006 | Koyama | 345/690 |
| 7,051,287 B1 * | 5/2006 | Tsunoda | 715/778 |
| 7,196,677 B2 * | 3/2007 | Sato et al. | 345/1.3 |
| 7,227,593 B2 * | 6/2007 | Lee et al. | 348/745 |
| 7,252,387 B2 * | 8/2007 | Raskar et al. | 353/69 |
| 7,330,164 B2 * | 2/2008 | George | 345/7 |
| 7,334,901 B2 * | 2/2008 | El-Ghoroury | 353/94 |

FOREIGN PATENT DOCUMENTS

| | | |
|---|---|---|
| GB | 2327169 | 1/1999 |
| WO | WO 00/07376 | 2/2000 |
| WO | WO 02/07431 | 1/2002 |
| WO | WO 00/18139 | 3/2003 |

\* cited by examiner

METHOD AND SYSTEM FOR SYNCHRONIZING COLORIMETRIC RENDERING OF A JUXTAPOSITION OF DISPLAY SURFACES

RELATED APPLICATIONS

This is a U.S. national stage of International patent application No. PCT/FR03/00525, filed on 18 Feb. 2003.

FIELD OF THE INVENTION

This invention relates to the display of an image or a sequence of images on several adjacent display screens, each display screen being controlled by an independent video processing system.

It is applicable particularly, but not exclusively, to the display of images such as video images on a large screen composed of several adjacent and contiguous screens forming a screen wall. In such a system, each display unit is controlled by a separate video system so as to display a corresponding part of video images. Each display unit may be composed of an overhead display system, a video projection system, or a solid screen such as a cathode ray tube screen, or a plasma or liquid crystal screen.

In particular, it is applicable to videoconference systems putting two remote sites into two-directional audiovisual communication through a high speed transmission network, each remote site being equipped with what is called a "remote presence wall" composed of several adjacent and contiguous screens. In this type of system, each display unit is controlled by a separate video system connected to a camera installed on the other remote site.

The colorimetric rendering on each screen must be uniform from one screen to the other, so that the discontinuities in the images displayed by the different screens forming the "remote presence wall" due to the fact that they are displayed by different screens, are not visible.

BACKGROUND OF THE INVENTION

At the present time, the calorimetric setting of each display unit is done manually. It has been shown that this solution is not completely satisfactory, particularly due to the fact that the precision obtained by manual settings is not enough to eliminate all perceptible differences in the colorimetric rendering between two adjacent screens. Since the operator's eye is the only measurement instrument used, the evaluation of differences in calorimetric rendering remains very subjective.

Tools are available for observing and measuring display surfaces, such as colorimetric probes. However, this type of tool has never been combined with display unit adjustment systems or video processing systems.

Moreover, the operator remains dependent on the limits of the capacity to adjust the different video systems (no very large adjustment increment, adjustment inertia). All these limitations mean that manual adjustments are very approximate.

Moreover, regardless of the display technique used, the colorimetric rendering of a screen is subject to slow variations, particularly due to aging of some display unit or video system devices, which means that such adjustments have to be made regularly. Since these adjustments require a visit by an operator, it often happens that they are not carried out when they are necessary.

SUMMARY OF THE INVENTION

One object of the invention is to eliminate these disadvantages, but without replacing manual adjustments that are still necessary to correct large differences in colorimetric rendering between adjacent screens.

This and other objects are attained in accordance with one aspect of the invention directed to a method for making the colorimetric rendering of a display surface uniform, this surface including at least two adjacent display screens, controlled by video processing systems through which the corresponding video flows pass. According to the invention, this method comprises for each pair of adjacent screens in said display screens the steps of:

periodically sampling by a calculation device image data in two corresponding screen areas in the pair of adjacent screens, analyzing by the calculation device image data sampled in each period to determine a difference in colorimetric rendering between the two screen areas, determining by a correction device connected to the calculation device a process to be applied to the video stream to one of the two video systems controlling the two screens in the pair of adjacent screens, by applying a predetermined correction law to the difference in calorimetric rendering, and applying the process to said video system by the correction device, in order to make the calorimetric rendering of the display surface uniform.

Advantageously, the sampled image data are obtained using a camera placed overlapping the two screens on each pair of adjacent screens.

According to one specific feature of the invention, the analysis of sampled image data includes the steps of:

considering two measurement areas located symmetrically on each side of a separation line between the two screens in each pair of adjacent screens, in the sampled image data, determining color components in each measurement area, and determining differences in color components by comparing each average color component in one of the two measurement areas with the corresponding average color component in the other measurement area, the differences in color components forming the difference in calorimetric rendering.

Preferably, the average color components in each measurement area are determined from color components on each pixel in the measurement area.

Also preferably, image data are sampled at intervals of the order of a few minutes to a few tens of minutes.

According to another specific feature of the invention, the correction law applied by the correction device to the difference in calorimetric rendering is a matrix type law.

Alternatively, the correction law applied by the correction device to the difference in calorimetric rendering may be an iterative type law with a convergence criterion.

According to yet another specific feature, the method according to the invention includes a step of comparing the difference in colorimetric rendering with a predefined threshold, and if the difference in the calorimetric rendering is greater than the threshold, no correction process is applied to the video stream of either of the two video systems controlling the two screens in the pair of adjacent screens.

Advantageously, if the difference in calorimetric rendering is greater than the threshold for several consecutive periods, an alert signal is sent indicating that a manual adjustment of the video processing systems is necessary to make the calorimetric rendering of the display surface uniform.

According to yet another specific feature, the method according to the invention includes steps of storing a history of calorimetric differences determined for each pair of display screens, and making an analysis of the history to set up a colorimetric drifts law for each display screen.

Another aspect of the invention is directed to a system for making the colorimetric rendering of a display surface uniform, this surface including at least two adjacent display screens, controlled by video processing systems through which the corresponding video streams pass. According to the invention, this system comprises a system for correction of the colorimetric rendering of the display screen by separation area between two adjacent screens, each correction system including:

a sensor overlapping the separation area between the two screens, for supplying image data of images displayed on the two screens, a calculation device connected to the sensor and designed to periodically sample image data from among the image data supplied by the sensor, analyze the sampled image data, and deduce from said analysis a difference in calorimetric rendering between the two screens, a correction device connected to the calculation device and designed to determine a process to be applied to the video stream from one of the two video systems controlling the corresponding two screens, applying a predetermined correction law to the difference in colorimetric rendering, and to apply said process to the video stream in order to make the calorimetric rendering of the display surface uniform.

Advantageously, the sensor is a video camera.

BRIEF DESCRIPTION OF THE DRAWINGS

One preferred embodiment of the invention will be described below as a non-limitative example, with reference to the appended figures, wherein:

FIG. 1 shows a video image display system with two contiguous screens 10a, 10b.

DETAILED DESCRIPTION OF THE DRAWINGS

Figure 1:
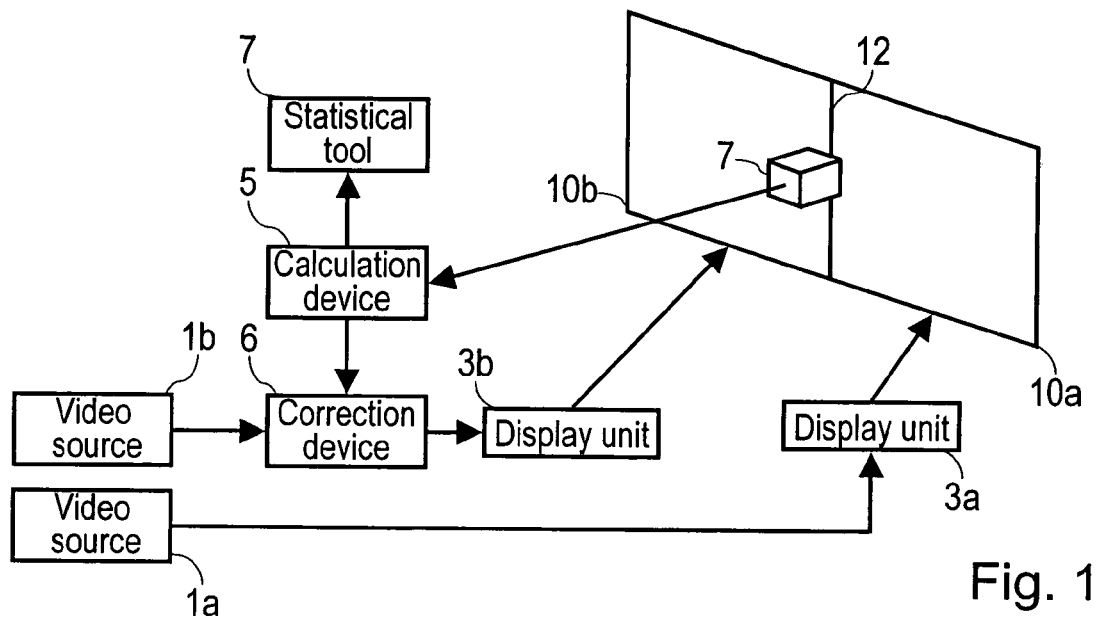
FIG. 1 shows a video image display system with two display units, equipped with the system according to the invention.

This system includes two video systems each comprising a video image source 1a, 1b connected to a display unit 3a, 3b, each display unit controlling one of the display screens 10a, 10b. The assembly consisting of a display unit 3a, 3b and a display screen 10a, 10b actually represents an overhead projection system, a video projection system, or a solid screen such as a cathode ray tube screen, a plasma screen or a liquid crystal screen.

According to the invention, a sensor 7 is placed overlapping the separation area 12 between the two screens 10a, 10b, that transmits colorimetric measurements to a calculation device 5 designed to determine a difference in colorimetric rendering between the two screens 10a, 10b. The calculation device is connected to a correction device 6 inserted in one of the video systems and designed to correct color components of the video stream passing through the system as a function of the difference in colorimetric rendering determined by the calculation device 5. In the example illustrated in FIG. 1, the correction device 6 is placed between the video source 1b and the display unit 3b so as to modify color component parameters of the video stream from the source 1b, before applying them to the display unit 3b.

For example, the sensor 7 is composed of a video camera that transmits a video stream, or a periodic digital image, to the calculation device 5.

Figure 2:
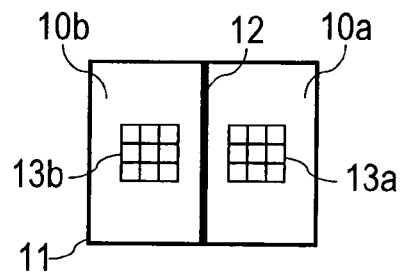
FIG. 2 shows an image taken by the sensor of the system shown in FIG. 1, for which the colorimetric rendering is analyzed in accordance with the method according to the invention.
Figure 3:
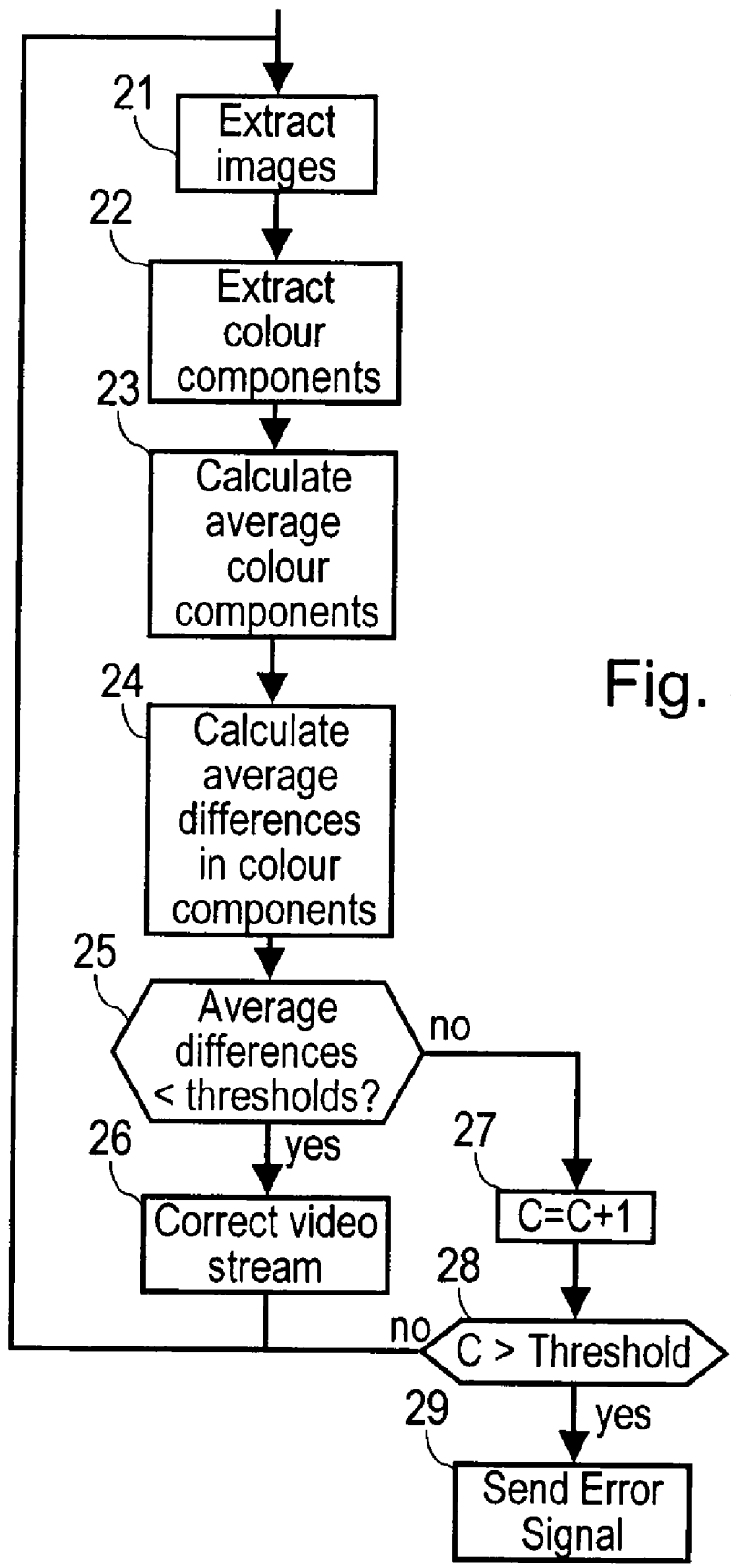
FIG. 3 illustrates the method according to the invention in the form of a flow chart.

In accordance with the method according to the invention illustrated in FIG. 3, the calculation device 5 samples 21 one or several images 11 of the video stream at regular intervals. Such an image is illustrated in FIG. 2. Each of these images represents part of the separation zone between the two contiguous screens 10a, 10b, and part of the images displayed by these two screens.

The calculation device analyses sampled images considering two measurement areas 13a, 13b distributed symmetrically on each side of the separation area 12 between the two screens. For example, the two measurement areas 13a, 13b may be squares with p×p pixels, and 3×3 pixels in the example shown in FIG. 2.

Since the colorimetric drift of display units is generally a relatively slowly changing phenomenon, there is no need to carry out the processing done by the calculation device 5 continuously. A corrective processing done at intervals of between a few minutes and a few tens of minutes is sufficient.

The analysis performed by the calculation device 5 consists of determining 22 the corresponding values of the R (red), G (green) and B (blue) components for each pixel in each area 13a, 13b, according to the units used in the computer domain. These values may for example be determined in the form of binary values on 8 bits.

The values of the color components thus determined are then weighted and averaged 23 on all pixels in each area 13a, 13b to obtain global color components $Ca_R$, $Ca_G$, $Ca_B$ and $Cb_R$, $Cb_G$, $Cb_B$ for each of these areas. The calculation device may also calculate an average of these values on several sampled images.

The global components $Ca_R$, $Ca_G$, $Ca_B$ and $Cb_R$, $Cb_G$, $Cb_B$ obtained for each zone 13a and 13b are then compared 24 in pairs to determine a calorimetric difference between the two screens, this difference consisting of a difference value for each color component. For example, this difference may be in the form $(\Delta C_R, \Delta C_G, \Delta C_B) = (Cb_R - Ca_R, Ca_G - Cb_G, Ca_B - Cb_B)$.

The value of this calorimetric difference is transmitted to the correction device 6 that uses a correction law $f(\Delta C_R, \Delta C_G, \Delta C_B)$ to deduce 26 the correction processing to be applied to the video stream to be corrected, in other words the video stream output from the source 1b in the example in FIG. 1, and then applies this processing.

The correction law $f(\Delta C_R, \Delta C_G, \Delta C_B)$ may be of the matrix or iterative type using a convergence criterion.

A matrix type correction law consists of applying the calculated difference in colorimetric rendering $(\Delta C_R, \Delta C_G, \Delta C_B)$ or a function of this difference to each pixel in the images of the video stream to be corrected.

An iterative type correction law consists of applying the difference in colorimetric rendering $(\Delta C_R, \Delta C_V, \Delta C_B)$ to each pixel of images in the video stream to be corrected, and consecutively remeasuring the new difference $(\Delta C_R', \Delta C_V', \Delta C_B')$, checking that it is less than the previously measured difference, and applying this new difference to all pixels. The convergence criterion is therefore: $\Delta C_R' < \Delta C_R$, $\Delta C_V' < \Delta C_V$, $\Delta C_B' < \Delta C_B$. This processing is repeated until a difference in colorimetric rendering less than a predetermined threshold is obtained, this threshold being advantageously the perception threshold of the human eye. It the convergence criterion is not satisfied, then the iterative method is not appropriate and the matrix correction method is applied.

Obviously, these processings may be done in other systems of units, such as the YUV video units system or the system of XYZ units used for the human eye. Advantageously, it would be possible to use known transformation matrices to convert values of all components in RGB into other systems of units that are better adapted to the video system to be corrected.

Preferably, the values of differences measured on each color component is compared 25 with a corresponding predetermined threshold value, so as to be able to determine if these differences are acceptable by the correction device 6, in other words if they are not too large to be corrected by this correction device.

If these differences are incompatible with correction possibilities available in the correction device 6, the correction device will not apply any correction to the video stream output from the source 1b. If these differences remain unacceptable during several consecutive measurement periods, the system sends 29 an alert signal to indicate that manual action will be necessary on the adjustment of the display units or the video systems. The system may increment 27 a counter C for this purpose and when the value of this counter exceeds 28 a certain threshold, the system sends an alert signal. Obviously, the value of the counter C will be reset to zero if a correction is made.

This arrangement means that a difference in color between images displayed on the two screens 10a, 10b resulting from the passage of an object in front of the camera(s) will not be taken into account, and when the edge of an object is displayed between the two measurement areas 13a, 13b.

Figure 4:
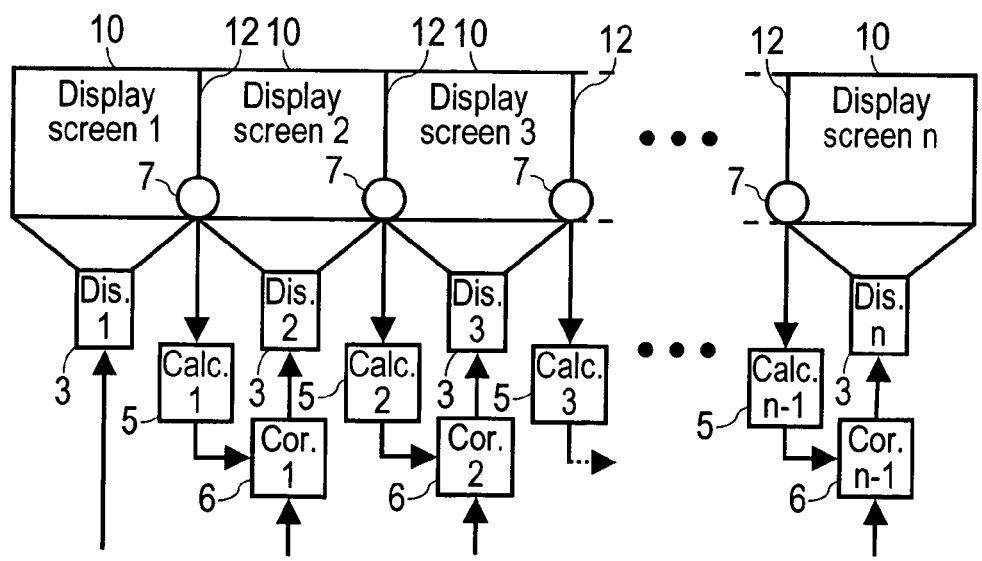
FIG. 4 shows a display screen with n display units, equipped with the system according to the invention.

The system described with reference to FIG. 1 may be generalized to n display screens, as shown in FIG. 4. In this figure, the display system comprises n display screens 10 (where n is an integer number more than 2), each screen being controlled by a corresponding display unit 3. The correction system according to the invention comprises a colorimetric measurement and correction system using the separation line 12 between two adjacent screens. Each rank i measurement and correction system (where i is an integer number between 1 and n−1) includes a sensor 7 positioned facing a separation line 12 between two adjacent screens 10 with ranks i and i+1, this sensor being coupled to a calculation device 5 calculating the rank i colorimetric drift, which is connected to a rank i correction device 6, inserted in the control video system of the rank i+1 display unit 3. Therefore this system includes n−1 calorimetric measurement and correction systems, the rank 2 to n display units 3 being adjusted one by one starting from the rank 1 screen 10.

It would be possible to store a history of differences calculated between the two measurement areas, and analyzing this history using a statistical tool 7 (FIG. 1) so as to create colorimetric drift laws as a function of the display unit types and models. These calorimetric drift laws may be used to anticipate and therefore plan operator actions to make manual adjustments.

The invention claimed is:

1. A method for adjusting a colorimetric rendering of a display surface, said display surface including at least one pair of adjacent display screens, each controlled by a video processing system through which a corresponding video stream passes for each pair of adjacent display screens, the method comprising:

receiving image data of images in the video stream displayed on a separation area located between two screens of each pair of adjacent display screens, wherein the image data comprises colorimetric measurements for each screen in each pair of adjacent display screens, and wherein the colorimetric measurements are taken from measurement areas distributed symmetrically on each side of the separation area;

periodically sampling the image data;

analyzing the image data sampled in each period to determine a difference in colorimetric rendering between the two screens in the pair of adjacent display screens; and applying a correction law, based on the difference in colorimetric rendering, to the images in the video stream of one of two video processing systems controlling the pair of adjacent display screens.

2. The method according to claim 1, wherein the image data are obtained using a video camera placed overlapping the separation area.

3. The method according to claim 1, wherein the analysis of sampled image data comprises:

determining average color components in each measurement area; and comparing each average color component in one of the two measurement areas with a corresponding average color component in the other measurement area to determine differences in color components which form the difference in colorimetric rendering.

4. The method according to claim 3, wherein average color components in each measurement area are determined from color components on each pixel in the measurement area.

5. The method according to claim 1, wherein image data are sampled at time intervals of a few minutes to a few tens of minutes.

6. The method according to claim 1, wherein the correction law applied by the correction device to the difference in colorimetric rendering is a matrix type law.

7. The method according to claim 1, wherein the correction law applied by the correction device to the difference in colorimetric rendering is an iterative type law with a convergence criterion.

8. The method according to claim 1, comprising:

comparing the difference in colorimetric rendering with a predefined threshold; and applying no correction processing to the video stream of either of the two video processing systems controlling the pair of adjacent display screens if the difference in the colorimetric rendering is greater than the threshold.

9. The method according to claim 8, further comprising:

sending an alert signal indicating that a manual adjustment of the video processing systems is necessary to make the colorimetric rendering of the display surface uniform if the difference in colorimetric rendering is greater than the threshold for several consecutive periods.

10. The method according to claim 1, further comprising:

storing a history of colorimetric differences determined for each pair of adjacent display screens; and performing an analysis of the history to set up a colorimetric drifts law for each display screen.

11. A system for making a colorimetric rendering of a display surface uniform, said display surface including at least one pair of adjacent display screens, each controlled by a video processing system through which a corresponding video stream passes, the system comprising:

a correction system correcting the colorimetric rendering of one display screen of said pair of adjacent display screens, the correction system including:

a sensor for supplying image data of images displayed on the pair of adjacent display screens;

a calculation device connected to the sensor and configured to periodically sample image data from among the image data supplied by the sensor and to a first difference in colorimetric rendering between two screen areas respectively situated in the pair of adjacent display screens and a correction device connected to the calculation device and configured to determine, by applying a correction law based on the first difference in colorimetric rendering to a corrected video stream of one of two video processing systems controlling the pair of adjacent display screens and to apply said process to the video stream to make the colorimetric rendering of the display surface uniform, wherein the correction law comprises:

while the first difference is greater than a predetermined threshold:
applying the first difference in colorimetric rendering to each pixel of images in the corrected video stream,
determining a second difference in colorimetric rendering between the two screen areas after applying the first difference in colorimetric rendering,
comparing the second difference to the first difference, and
responsive to the second difference being greater than the first difference, applying a matrix correction method to the corrected video stream.

12. The system according to claim 11, wherein the sensor is a video camera placed overlapping a separation area between the pair of adjacent display screens.

* * * * *